(12) United States Patent
Huang et al.

(10) Patent No.: US 12,046,008 B2
(45) Date of Patent: Jul. 23, 2024

(54) POSE CALIBRATION METHOD, ROBOT AND COMPUTER READABLE STORAGE MEDIUM

(71) Applicant: UBTECH ROBOTICS CORP LTD, Shenzhen (CN)

(72) Inventors: Xiangbin Huang, Shenzhen (CN); Wenzhi Xu, Shenzhen (CN); Gaobo Huang, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 363 days.

(21) Appl. No.: 17/721,313

(22) Filed: Apr. 14, 2022

(65) Prior Publication Data

US 2022/0327739 A1 Oct. 13, 2022

Related U.S. Application Data

(63) Continuation of application No. PCT/CN2021/125046, filed on Oct. 20, 2021.

(30) Foreign Application Priority Data

Mar. 30, 2021 (CN) .......................... 202110344237.1

(51) Int. Cl.
  *G06T 7/80* (2017.01)
  *B25J 19/02* (2006.01)

(52) U.S. Cl.
  CPC ............... *G06T 7/80* (2017.01); *B25J 19/023* (2013.01); *G06T 2207/10028* (2013.01)

(58) Field of Classification Search
  CPC ............. G06T 7/80; G06T 2207/10028; G06T 2207/10016; G06T 2207/30244; G06T 7/85; G06T 7/73; B25J 19/023; B25J 9/1692; B25J 9/1697; G05B 2219/39057; Y02T 10/40

See application file for complete search history.

(56) References Cited

U.S. PATENT DOCUMENTS

2021/0241476 A1* 8/2021 Mishra ................... G06T 7/344

FOREIGN PATENT DOCUMENTS

CN 112541950 A 3/2021

OTHER PUBLICATIONS

ISR for PCT/CN2021/125046.
Written opinions of ISA for PCT/CN2021/125046.

* cited by examiner

*Primary Examiner* — Christopher Wait

(57) ABSTRACT

A pose calibration method, a robot, and a computer readable storage medium are provided. The method includes: obtaining, through a depth camera on a robot, a depth image including a target plane (i.e., a plane where the robot is located); determining point cloud data corresponding to the depth image; and calibrating a target pose of the depth camera based on the point cloud data and a preset optimization method, that is, calibrating a pitch angle and a roll angle of the depth camera and a height of the depth camera in a coordinate system of the robot. In this manner, the accuracy of the calibration of the target pose can be effectively improved while simple in implementation and small in calculation amount, and the efficiency of the calibration of the target pose can be improved so as to improve the user experience.

20 Claims, 4 Drawing Sheets

POSE CALIBRATION METHOD, ROBOT AND COMPUTER READABLE STORAGE MEDIUM

CROSS REFERENCE TO RELATED APPLICATIONS

The present disclosure is a continuation-application of International Application PCT/CN2021/125046, with an international filing date of Oct. 20th 2021, which claims foreign priority of Chinese Patent Application No. 202110344237.1, filed on Mar. 30, 2021 in the State Intellectual Property Office of China, the contents of all of which are hereby incorporated by reference.

BACKGROUND

1. Technical Field

The present disclosure relates to robotic technology, and particularly to a pose calibration method, a robot, and a computer readable storage medium.

2. Description of Related Art

During the movement of a robot, a depth camera needs to be used to accurately detect the ground, obstacles and cliffs for obstacle avoidance, so it is essential to accurately calibrate the pose of the depth camera. In the prior art, it is usually necessary to make a special calibration board (such as a board with black/white squares) to perform the pose calibration of the depth camera, and the accuracy and efficiency of the calibration will be low.

BRIEF DESCRIPTION OF THE DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

Figure 1:
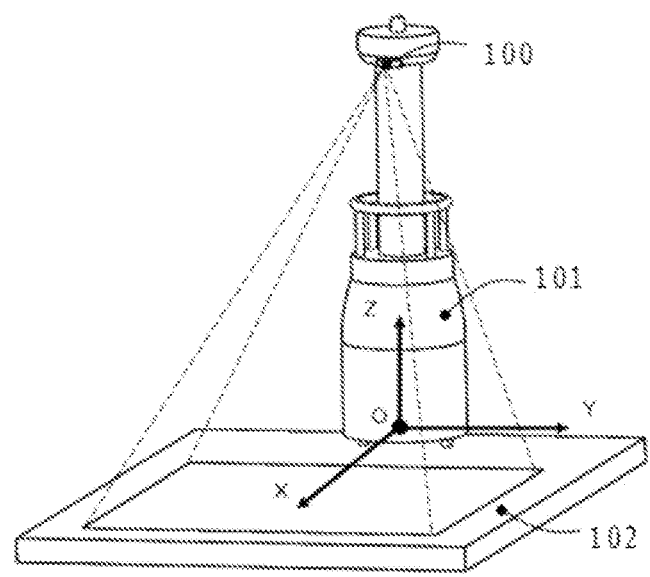
FIG. 1 is a schematic diagram of an application scenario according to an embodiment of the present disclosure.

In the following descriptions, for purposes of explanation instead of limitation, specific details such as particular system architecture and technique are set forth in order to provide a thorough understanding of embodiments of the present disclosure. However, it will be apparent to those skilled in the art that the present disclosure may be implemented in other embodiments that are less specific of these details. In other instances, detailed descriptions of well-known systems, devices, circuits, and methods are omitted so as not to obscure the description of the present disclosure with unnecessary detail.

It is to be understood that, when used in the description and the appended claims of the present disclosure, the terms "including" and "comprising" indicate the presence of stated features, integers, steps, operations, elements and/or components, but do not preclude the presence or addition of one or a plurality of other features, integers, steps, operations, elements, components and/or combinations thereof.

It is also to be understood that, the term "and/or" used in the description and the appended claims of the present disclosure refers to any combination of one or more of the associated listed items and all possible combinations, and includes such combinations.

As used in the description and the appended claims, the term "if" may be interpreted as "when" or "once" or "in response to determining" or "in response to detecting" according to the context. Similarly, the phrase "if determined" or "if [the described condition or event] is detected" may be interpreted as "once determining" or "in response to determining" or "on detection of [the described condition or event]" or "in response to detecting [the described condition or event]".

In addition, in the specification and the claims of the present disclosure, the terms "first", "second", "third", and the like in the descriptions are only used for distinguishing, and cannot be understood as indicating or implying relative importance.

References such as "one embodiment" and "some embodiments" in the specification of the present disclosure mean that the particular features, structures or characteristics described in combination with the embodiment(s) are included in one or more embodiments of the present disclosure. Therefore, the sentences "in one embodiment," "in some embodiments," "in other embodiments," "in still other embodiments," and the like in different places of this specification are not necessarily all refer to the same embodiment, but mean "one or more but not all embodiments" unless specifically emphasized otherwise. The terms "comprising", "including", "having" and their variants mean "including but not limited to" unless specifically emphasized otherwise.

A mobile device such as a mobile robot may be installed with a depth camera. During the movement of the mobile device, the depth camera may be used to detect the ground, obstacles and cliffs for obstacle avoidance. In order to enable the mobile device to accurately detect the ground, obstacles and cliffs, the pose of the depth camera needs to be calibrated in advance. Due to the installation errors and measurement errors of the depth camera, the current method for calibrating depth camera pose through a specially made calibration board (e.g., a board with black/white squares) has problems of low accuracy and efficiency.

In order to solve the forgoing problems, an embodiment of the present disclosure provides a pose calibration method which may obtain a depth image including a target plane (i.e., the plane where the robot is located) through a depth camera installed on the robot, and determine point cloud data corresponding to the depth image so as to calibrate, using a preset optimization method, a target pose of the depth camera based on the point cloud data, that is, to calibrate a pitch angle and a roll angle of the depth camera and a height of the depth camera in a robot coordinate system (i.e., the coordinate system of the robot), thereby effectively improving the accuracy of the calibration of the target pose while simple in implementation and small in calculation amount. In such manner, the efficiency of the calibration of the target pose is improved to enhance the user experience and have better ease of use and practicability.

FIG. 1 is a schematic diagram of an application scenario according to an embodiment of the present disclosure. As shown in FIG. 1, a depth camera 100 may be installed on a robot 101, for example, on the upper part of the robot 101 to face obliquely downward, so that the field of view of the depth camera 100 can cover the ground 102, that is, the field of view of the depth camera 100 is as shown by an area of the ground 102 which is indicated by the dotted line in FIG. 1 so that the depth image including the ground 102 where the robot 101 is located can be obtained by the depth camera 100 so as to guide the robot 101 to avoid obstacles.

It should be understood that, in this embodiment, the target pose of the depth camera 100 may be calibrated based on the depth image obtained by the depth camera 100. In the calibration process of the target pose, a camera coordinate system (i.e., the coordinate system of the depth camera) and the robot coordinate system need to be involved. In which, the robot coordinate system may be a coordinate system established by taking a projection point of a center point of the robot 101 on a ground 102 as an origin O, a directly front direction of the robot 101 as an X axis, a directly left direction of the robot 101 as a Y axis, and a directly upward direction of the robot 101 as a Z axis.

In which, in the robot coordinate system, the position coordinates of the depth camera 100 may be expressed as (Xs, Ys, Zs), and the posture parameters may be expressed as (Ro, Po, Yo), where Ro is a roll angle of the depth camera 100 which is the rotation angle of the depth camera 100 around the X axis; Po is a pitch angle of the depth camera 100 which is the rotation angle of the depth camera 100 around the Y axis; and Yo is a yaw angle of the depth camera 100 which is the rotation angle of the depth camera 100 around the Z axis.

It should be noted that, the main parameters affecting the detection of the ground that is performed by the depth camera 100 are Zs, Ro and Po, while the other parameters do not affect the ground detection. Therefore, in this embodiment, the pose calibration method mainly calibrates Zs, Ro and Po of the depth camera 100, that is, calibrating the height of the depth camera in the robot coordinate system and the roll angle and pitch angle of the depth camera. It should be understood that, the height in the robot coordinate system may be a Z-axis component or a Z-axis coordinate in the robot coordinate system. That is, in this embodiment, the Z-axis component and the Z-axis coordinate have the same meaning.

Figure 2:
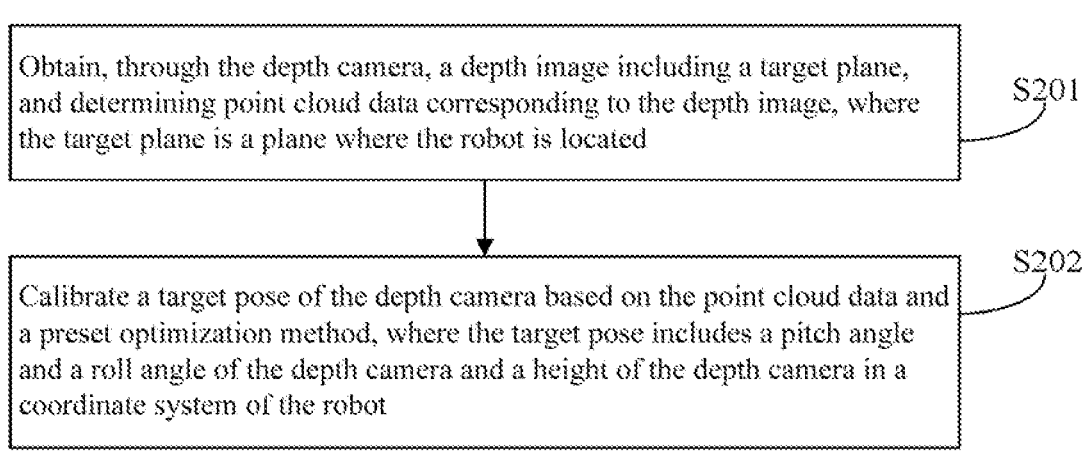
FIG. 2 is a flow chart of a pose calibration method according to an embodiment of the present disclosure.

FIG. 2 is a flow chart of a pose calibration method according to an embodiment of the present disclosure. In this embodiment, the pose calibration method is a computer-implemented method executable for a processor (of the above-mentioned robot). The method may be implemented through the robot 101 shown in FIG. 1, a pose calibration apparatus shown in FIG. 3, or a robot shown in FIG. 4. The pose calibration method may be applied to the application scenario shown in FIG. 1. As shown in FIG. 2, the pose calibration method may include the following steps.

S201: obtaining, through the depth camera, a depth image including a target plane, and determining point cloud data corresponding to the depth image, where the target plane is a plane where the robot is located.

In this embodiment, the robot may be placed on a level open ground. The target plane is the ground where the robot is located. Based on this, the depth camera on the robot can obtain the depth image including the target plane, that is, the depth image of the ground within the field of view of the depth camera can be obtained, and the depth image can be converted into point cloud data so as to obtain the point cloud data corresponding to the depth image. In which, the number of the pixels in the point cloud data corresponds to the resolution of the depth camera. For example, when the resolution of the depth camera is 640×480, the point cloud data with 640×480 pixels can be obtained.

S202: calibrating a target pose of the depth camera based on the point cloud data and a preset optimization method, where the target pose includes a pitch angle and a roll angle of the depth camera and a height of the depth camera in a coordinate system of the robot.

As an example, the calibrating the target pose of the depth camera based on the point cloud data and the preset optimization method (step S202) may include:

a: obtaining candidate poses of the depth camera, where the candidate poses include an initial pose of the depth camera; and b: calibrating the target pose of the depth camera according to the candidate pose, the point cloud data and the optimization method.

It can be understood that, the robot detects obstacles or cliffs on the ground mainly based on the height of the object on the ground. In theory, the object with the height greater than 0 is an obstacle, and the object with the height less than 0 is a cliff. The height refers to the height of the object in the robot coordinate system, that is, a Z-axis component of the point cloud data corresponding to the depth image captured by the depth camera that is converted to the robot coordinate system.

Therefore, it is necessary to convert the camera coordinate system to the robot coordinate system so as to convert the point cloud data to the robot coordinate system. In this embodiment, the conversion from the camera coordinate system to the robot coordinate system needs the translation of the Z axis after the rotation of the X axis and the rotation of the Y axis, then, that is, the coordinate conversion matrix T from the camera coordinate system to the robot coordinate system may be T=LZRYRX. In which, LZ is the translation matrix along the Z axis, RY is the rotation matrix around the Y axis, and RX is the rotation matrix around the X axis.

Specifically, $$L_z = \begin{bmatrix} 1 & 0 & 0 & 0 \\ 0 & 1 & 0 & 0 \\ 0 & 0 & 1 & Zs \\ 0 & 0 & 0 & 1 \end{bmatrix},$$

$$R_y = \begin{bmatrix} \cos Po & 0 & \sin Po & 0 \\ 0 & 1 & 0 & 0 \\ -\sin Po & 0 & \cos Po & 0 \\ 0 & 0 & 0 & 1 \end{bmatrix},$$

$$R_x = \begin{bmatrix} 1 & 0 & 0 & 0 \\ 0 & \cos Ro & -\sin Ro & 0 \\ 0 & \sin Ro & \cos Ro & 0 \\ 0 & 0 & 0 & 1 \end{bmatrix};$$

that is, the coordinate conversion matrix T from the camera coordinate system to the robot coordinate system is:

$$T = L_z R_y R_x = \begin{bmatrix} \cos Po & \sin Po \sin Ro & \sin Po \cos Ro & 0 \\ 0 & \cos Ro & -\sin Ro & 0 \\ -\sin Po & \cos Po \sin Ro & \cos Po \cos Ro & Zs \\ 0 & 0 & 0 & 1 \end{bmatrix}.$$

Therefore, the conversion relationship between the homogeneous coordinates S(x0, y0, z0, 1) of the camera coordinate system and the homogeneous coordinates R(x1, y1, z1, 1) of the robot coordinate system may be R=TS. That is, the relationship between the Z-axis component converted to the robot coordinate system and Po, Ro and Zs may be:

$$z_1 = -x_0 \sin Po + y_0 \cos Po \sin Ro + z_0 \cos Po \cos Ro + Zs.$$

It can be understood that, in the robot coordinate system, when the robot is on an absolute horizontal plane and the depth camera has no installation error and measurement error, the Z-axis coordinate of each point cloud data converted to the robot coordinate system will be 0. However, due to the existence of installation errors and measurement errors, the Z-axis coordinate of the point cloud data converted to the robot coordinate system will vary within a certain range. For reducing the installation errors and measurement errors, it is necessary to calibrate the target pose of the depth camera, so that when the robot is in the horizontal plane, the Z-axis coordinate of each point cloud data converted to the robot coordinate system is close to 0. Therefore, in this embodiment, the objective function corresponding to the optimization method may be set according to the relationship between the above-mentioned Z-axis component and Po, Ro and Zs, so as to accurately calibrate the target pose of the depth camera based on point cloud data using the objective function. Specifically, the objective function corresponding to the optimization method may be set using an equation of:

$$f(Po, Ro, Zs) = \sum_{i=1}^{i=N} (-x_i \sin Po_j + y_i \cos Po_j \sin Ro_j + z_i \cos Po_j \cos Ro_j + Zs_j)^2;$$

where, $f(Po, Ro, Zs)$ is the objective function corresponding to the optimization method, N is a total number of the point cloud data, $(x_i, y_i, z_i)$ is coordinate of the i-th point cloud data in a coordinate system of the camera, $Po_j$ is the pitch angle corresponding to the j-th candidate pose, $Ro_j$ is the roll angle corresponding to the j-th candidate pose, and $Zs_j$ is the height corresponding to the j-th candidate pose.

It should be understood that, the candidate poses may include the initial pose of the depth camera and all other possible poses of the depth camera. In which, the initial pose of the depth camera may be the pose of the depth camera when it is actually installed on the robot. All possible poses of the depth camera may be determined according to the actual situation, and are not limited in this embodiment.

After determining the objective function corresponding to the optimization method, it may obtain calculation results by substituting the point cloud data and the candidate pose into an objective function corresponding to the optimization method, determine a target calculation result meeting a preset condition (among the obtained calculation results), and calibrate the candidate pose corresponding to the target calculation result as the target pose of the depth camera. In which, the preset condition may be that the calculation result is the smallest, that is, the smallest calculation result may be taken as the target calculation result, so that the candidate pose with the smallest calculation result can be determined as the target pose of the depth camera. Therefore, the calibrated target pose can make the Z-axis coordinate of each point cloud data that is converted to the robot coordinate system closest to 0, so as to reduce the installation errors and measurement errors, and improve the accuracy of the calibration of the pose of the depth camera, so that the robot can effectively detect the ground for obstacle avoidance.

For example, the initial pose of the depth camera may be used as the first candidate pose, and the first candidate pose and point cloud data (for example, point cloud data of 640-480 pixels) may be substituted into the objective function corresponding to the optimization method so as to calculate the calculation result corresponding to the first candidate pose. Then, the second candidate pose may be obtained, and the second candidate pose and the point cloud data may be substituted into the objective function corresponding to the optimization method so as to calculate the calculation result corresponding to the second candidate pose, and so on until the last candidate pose and the point cloud data are substituted into the objective function corresponding to the optimization method so as to calculate the calculation result corresponding to the last candidate pose. Finally, the smallest calculation result is found from all the calculation results, and the candidate pose (e.g., the 5-th candidate pose) corresponding to the smallest calculation result may be calibrated as the target pose of the depth camera.

In this embodiment, it may obtain a depth image including a target plane (i.e., the plane where the robot is located) through a depth camera installed on the robot, and determine point cloud data corresponding to the depth image, so as to calibrate, using a preset optimization method, a target pose of the depth camera based on the point cloud data, that is, to calibrate a pitch angle and a roll angle of the depth camera and a height of the depth camera in a robot coordinate system, thereby effectively improving the accuracy of the calibration of the target pose while simple in implementation and small in calculation amount. In such manner, the efficiency of the calibration of the target pose is improved to enhance the user experience and have better ease of use and practicability.

It should be understood that, the sequence of the serial number of the steps in the above-mentioned embodiments does not mean the execution order while the execution order of each process should be determined by its function and internal logic, which should not be taken as any limitation to the implementation process of the embodiments.

Figure 3:
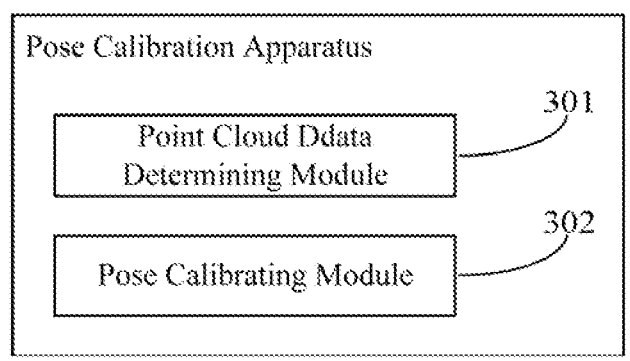
FIG. 3 is a schematic block diagram of the structure of a pose calibration apparatus according to an embodiment of the present disclosure.

FIG. 3 is a schematic block diagram of the structure of a pose calibration apparatus according to an embodiment of the present disclosure. The pose calibration apparatus corresponds to the pose calibration method described in the forgoing embodiments. For convenience of description, only the parts related to this embodiment are shown.

As shown in FIG. 3, the pose calibration apparatus is applied to a depth camera installed on a robot. The pose calibration apparatus may include:

a point cloud data determining module 301 configured to obtain, through the depth camera, a depth image including a target plane, and determining point cloud data corresponding to the depth image, where the target plane is a plane where the robot is located; and a pose calibrating module 302 configured to calibrate a target pose of the depth camera based on the point cloud data and a preset optimization method, where the target pose includes a pitch angle and a roll angle of the depth camera and a height of the depth camera in a coordinate system of the robot.

As an example, the pose calibrating module 302 may include:

a candidate pose obtaining unit configured to obtain candidate poses of the depth camera, where the candidate poses include an initial pose of the depth camera; and a target pose calibrating unit configured to calibrate the target pose of the depth camera according to the candidate pose, the point cloud data and the optimization method.

Specifically, the target pose calibrating unit may include:

an operation sub-unit configured to obtain calculation results by substituting the point cloud data and the candidate pose into an objective function corresponding to the optimization method; and a target pose calibrating sub-unit configured to determine a target calculation result meeting a preset condition among the obtained calculation results, and calibrate the candidate pose corresponding to the target calculation result as the target pose of the depth camera.

As an example, the objective function corresponding to the optimization method may be set using an equation of:

$$f(Po, Ro, Zs) = \sum_{i=1}^{i=N}(-x_i \sin Po_j + y_i \cos Po_j \sin Ro_j + z_i \cos Po_j \cos Ro_j + Zs_j)^2;$$

where, f(Po,Ro,Zs) is the objective function corresponding to the optimization method, N is a total number of the point cloud data, $(x_i, y_i, z_i)$ is coordinate of the i-th point cloud data in a coordinate system of the camera, $Po_j$ is the pitch angle corresponding to the j-th candidate pose, $Ro_j$ is the roll angle corresponding to the j-th candidate pose, and $Zs_j$ is the height corresponding to the j-th candidate pose.

As an example, the target pose calibrating sub-unit may be further configured to take the smallest calculation result as the target calculation result.

It can be understood that, the coordinate system of the robot is established by taking a projection point of a center point of the robot on a ground as an origin, a directly front direction of the robot as an X axis, a directly left direction of the robot as a Y axis, and a directly upward direction of the robot as a Z axis.

It should be noted that, the information exchange, execution process and other contents between the above-mentioned device/units are based on the same concept as the method embodiments of the present disclosure. For the specific functions and technical effects, please refer to the method embodiments, which will not be repeated herein.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

Figure 4:
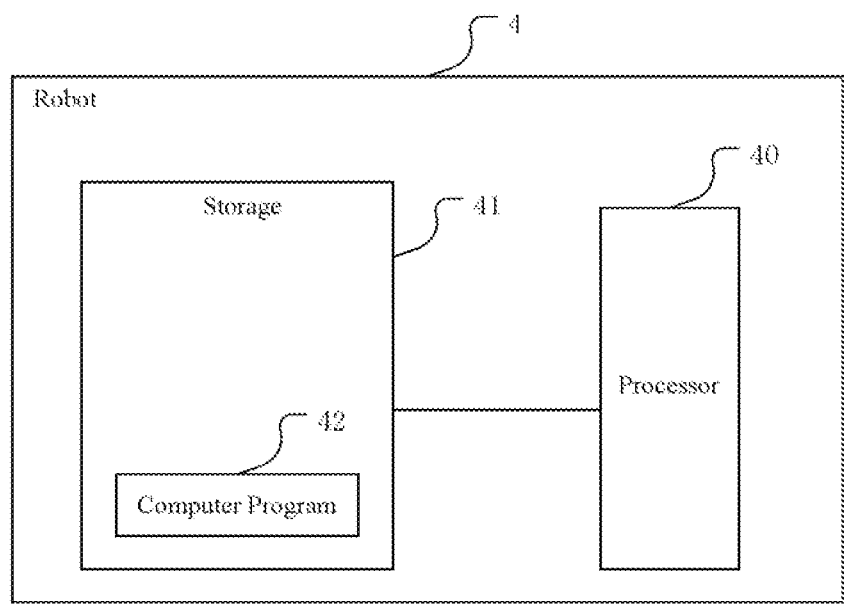
FIG. 4 is a schematic block diagram of the structure of a robot according to an embodiment of the present disclosure.

FIG. 4 is a schematic block diagram of the structure of a robot according to an embodiment of the present disclosure. As shown in FIG. 4, in this embodiment, a robot 4 is provided. The robot 4 includes at least one processor 40 (only one is shown in the figure), a storage 41, and a computer program 42 stored in the storage 41 and executable on the processor 40. When the processor 40 executes the computer program 42, the steps in each of the above-mentioned embodiments of the pose calibration method is implemented.

The robot 4 may include, but is not limited to, the processor 40 and the storage 41. It can be understood by those skilled in the art that FIG. 4 is merely an example of the robot 4 and does not constitute a limitation on the robot 4, and may include more or fewer components than those shown in the figure, or a combination of some components or different components, for example, an input/output device, a network access device, and the like.

The processor 40 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 41 may be an internal storage 41 unit of the robot 4, for example, a hard disk or a memory of the robot 4. In other embodiments, the storage 41 may also be an external storage 41 device of the robot 4, for example, a plug-in hard disk, a smart media card (SMC), a secure digital (SD) card, flash card, and the like, which is equipped on the robot 4. Furthermore, the storage 41 may further include both an internal storage unit and an external storage device, of the robot 4. The storage 41 is configured to store an operating system, application programs, a boot loader, data, and other programs such as codes of computer programs. The storage 41 may also be used to temporarily store data that has been or will be output.

In the embodiments of the present disclosure, a non-transitory computer readable storage medium is further provided. Computer program(s) are stored in the computer readable storage medium, and when the computer program(s) are executed by a processor, the steps in each of the above-mentioned method embodiments of the pose calibration method can be implemented.

In the embodiments of the present disclosure, a computer program product is further provided. When the computer program product is executed on a robot, the robot will be enabled to implement the steps in each of the above-mentioned method embodiments.

When the integrated unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include at least any entity or device, recording medium, computer memory, read-only memory (ROM), a random access memory (RAM), electric carrier signals, telecommunication signals and software distribution media that can carry computer program codes to the apparatus/robot, for example, a USB flash drive, a portable hard disk, a magnetic disk, an optical disk, or the like. In some jurisdictions, according to the legislation and patent practice, the computer readable medium cannot be the electric carrier signals and the telecommunication signals.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A computer-implemented pose calibration method for a depth camera installed on a robot, comprising:
   obtaining, through the depth camera, a depth image including a target plane, and determining point cloud data corresponding to the depth image, wherein the target plane is a plane where the robot is located;
   obtaining candidate poses of the depth camera, wherein the candidate poses include an initial pose of the depth camera; and
   calibrating a target pose of the depth camera based on the candidate poses and the point cloud data using the optimization method.

2. The method of claim 1, wherein the calibrating the target pose of the depth camera according to the candidate pose, the point cloud data using the optimization method comprises:
   obtaining calculation results by substituting the point cloud data and the candidate pose into an objective function corresponding to the optimization method; and
   determining a target calculation result meeting a preset condition among the obtained calculation results, and calibrating the candidate pose corresponding to the target calculation result as the target pose of the depth camera.

3. The method of claim 2, wherein the objective function corresponding to the optimization method is set using an equation of:

$$f(Po, Ro, Zs) = \sum_{i=1}^{i=N}(-x_i \sin Po_j + y_i \cos Po_j \sin Ro_j + z_i \cos Po_j \cos Ro_j + Zs_j)^2;$$

where, f(Po,Ro,Zs) is the objective function corresponding to the optimization method, N is a total number of the point cloud data, $(x_i, y_i, z_i)$ is coordinate of the i-th point cloud data in a coordinate system of the camera, $Po_j$ is the pitch angle corresponding to the j-th candidate pose, $Ro_j$ is the roll angle corresponding to the j-th candidate pose, and $Zs_j$ is the height corresponding to the j-th candidate pose.

4. The method of claim 2, wherein the determining the target calculation result meeting the preset condition among the obtained calculation results comprises:
   taking the smallest calculation result as the target calculation result.

5. The method of claim 1, wherein the coordinate system of the robot is established by taking a projection point of a center point of the robot on a ground as an origin, a directly front direction of the robot as an X axis, a directly left direction of the robot as a Y axis, and a directly upward direction of the robot as a Z axis.

6. The method of claim 1, wherein the initial pose of the depth camera is a pose of the depth camera when the depth camera is installed on the robot.

7. The method of claim 4, wherein the calibrating the candidate pose corresponding to the target calculation result as the target pose of the depth camera comprises:
   determining the candidate pose with the target calculation result as the target pose of the depth camera.

8. A robot, comprising:
   a processor;
   a memory coupled to the processor; and one or more computer programs stored in the memory and executable on the processor;

wherein, the one or more computer programs comprise:

instructions for obtaining, through the depth camera, a depth image including a target plane, and determining point cloud data corresponding to the depth image, wherein the target plane is a plane where the robot is located;

instructions for obtaining candidate poses of the depth camera, wherein the candidate poses include an initial pose of the depth camera; and instructions for calibrating a target pose of the depth camera based on the candidate poses and the point cloud data using the optimization method.

9. The method of claim 8, wherein the instructions for calibrating the target pose of the depth camera according to the candidate pose, the point cloud data using the optimization method comprise:

instructions for obtaining calculation results by substituting the point cloud data and the candidate pose into an objective function corresponding to the optimization method; and instructions for determining a target calculation result meeting a preset condition among the obtained calculation results, and calibrating the candidate pose corresponding to the target calculation result as the target pose of the depth camera.

10. The robot of claim 9, wherein the objective function corresponding to the optimization method is set using an equation of:

$$f(Po, Ro, Zs) = \sum_{i=1}^{i=N}(-x_i \sin Po_j + y_i \cos Po_j \sin Ro_j + z_i \cos Po_j \cos Ro_j + Zs_j)^2;$$

where, f(Po,Ro,Zs) is the objective function corresponding to the optimization method, N is a total number of the point cloud data, $(x_i, y_i, z_i)$ is coordinate of the i-th point cloud data in a coordinate system of the camera, $Po_j$ is the pitch angle corresponding to the j-th candidate pose, $Ro_j$ is the roll angle corresponding to the j-th candidate pose, and $Zs_j$ is the height corresponding to the j-th candidate pose.

11. The robot of claim 9, wherein the instructions for determining the target calculation result meeting the preset condition among the obtained calculation results comprise:

instructions for taking the smallest calculation result as the target calculation result.

12. The robot claim 8, wherein the coordinate system of the robot is established by taking a projection point of a center point of the robot on a ground as an origin, a directly front direction of the robot as an X axis, a directly left direction of the robot as a Y axis, and a directly upward direction of the robot as a Z axis.

13. The robot of claim 8, wherein the initial pose of the depth camera is a pose of the depth camera when the depth camera is installed on the robot.

14. The robot of claim 11, wherein the instructions for calibrating the candidate pose corresponding to the target calculation result as the target pose of the depth camera comprise:

instructions for determining the candidate pose with the target calculation result as the target pose of the depth camera.

15. A non-transitory computer readable storage medium for storing one or more computer programs, wherein the one or more computer programs comprise:

instructions for obtaining, through the depth camera, a depth image including a target plane, and determining point cloud data corresponding to the depth image, wherein the target plane is a plane where the robot is located;

instructions for obtaining candidate poses of the depth camera, wherein the candidate poses include an initial pose of the depth camera; and instructions for calibrating a target pose of the depth camera based on the candidate poses and the point cloud data using the optimization method.

16. The storage medium of claim 15, wherein the instructions for calibrating the target pose of the depth camera according to the candidate pose, the point cloud data using the optimization method comprise:

instructions for obtaining calculation results by substituting the point cloud data and the candidate pose into an objective function corresponding to the optimization method; and instructions for determining a target calculation result meeting a preset condition among the obtained calculation results, and calibrating the candidate pose corresponding to the target calculation result as the target pose of the depth camera.

17. The storage medium of claim 16, wherein the objective function corresponding to the optimization method is set using an equation of:

$$f(Po, Ro, Zs) = \sum_{i=1}^{i=N}(-x_i \sin Po_j + y_i \cos Po_j \sin Ro_j + z_i \cos Po_j \cos Ro_j + Zs_j)^2;$$

where, f(Po,Ro,Zs) is the objective function corresponding to the optimization method, N is a total number of the point cloud data, $(x_i, y_i, z_i)$ is coordinate of the i-th point cloud data in a coordinate system of the camera, $Po_j$ is the pitch angle corresponding to the j-th candidate pose, $Ro_j$ is the roll angle corresponding to the j-th candidate pose, and $Zs_j$ is the height corresponding to the j-th candidate pose.

18. The storage medium of claim 16, wherein the instructions for determining the target calculation result meeting the preset condition among the obtained calculation results comprise:

instructions for taking the smallest calculation result as the target calculation result.

19. The storage medium claim 15, wherein the coordinate system of the robot is established by taking a projection point of a center point of the robot on a ground as an origin, a directly front direction of the robot as an X axis, a directly left direction of the robot as a Y axis, and a directly upward direction of the robot as a Z axis.

20. The storage medium of claim 15, wherein the initial pose of the depth camera is a pose of the depth camera when the depth camera is installed on the robot.

* * * * *